United States Patent
Kojima et al.

(10) Patent No.: US 7,900,856 B2
(45) Date of Patent: Mar. 8, 2011

(54) METHOD OF SORTING RESIN

(75) Inventors: Tamao Kojima, Osaka (JP); Kazutaka Nishikawa, Nara (JP); Masatoshi Miyasaka, Osaka (JP); Akira Isomi, Osaka (JP); Daisuke Tabata, Osaka (JP); Hiroyuki Naka, Osaka (JP); Yoshinori Wada, Osaka (JP); Yasuyuki Sato, Nara (JP)

(73) Assignee: Panasonic Corporation, Osaka (JP)

( * ) Notice: Subject to any disclaimer, the term of this patent is extended or adjusted under 35 U.S.C. 154(b) by 395 days.

(21) Appl. No.: 12/282,188

(22) PCT Filed: Feb. 28, 2008

(86) PCT No.: PCT/JP2008/000375
§ 371 (c)(1),
(2), (4) Date: Sep. 9, 2008

(87) PCT Pub. No.: WO2008/136165
PCT Pub. Date: Nov. 13, 2008

(65) Prior Publication Data
US 2010/0243772 A1    Sep. 30, 2010

(30) Foreign Application Priority Data
May 1, 2007  (JP) .................................. 2007-120431

(51) Int. Cl.
*B02B 5/02*      (2006.01)
*B02C 19/00*   (2006.01)

(52) U.S. Cl. ............................................. 241/22; 241/23
(58) Field of Classification Search ................... 241/22, 241/23; 209/11
See application file for complete search history.

(56) References Cited

U.S. PATENT DOCUMENTS

| | | | | |
|---|---|---|---|---|
| 3,880,360 | A * | 4/1975 | Peng et al. | 241/3 |
| 5,272,216 | A * | 12/1993 | Clark, Jr. et al. | 525/362 |
| 5,590,789 | A | 1/1997 | Stricker et al. | 209/11 |
| 5,814,673 | A * | 9/1998 | Khait | 521/40 |
| 6,112,903 | A * | 9/2000 | Kimmel et al. | 209/11 |
| 6,180,685 | B1 * | 1/2001 | Khait | 521/40 |
| 6,494,390 | B1 * | 12/2002 | Khait et al. | 241/23 |
| 6,849,215 | B2 * | 2/2005 | Khait | 264/118 |

FOREIGN PATENT DOCUMENTS

| | | |
|---|---|---|
| JP | 51-103983 | 9/1976 |
| JP | 11-226957 | 8/1999 |
| JP | 2002-46128 | 2/2002 |
| JP | 2002-234031 | 8/2002 |

* cited by examiner

*Primary Examiner* — Bena Miller
(74) *Attorney, Agent, or Firm* — Steptoe & Johnson LLP

(57) ABSTRACT

A sorting member with an optimized surface shape is adopted to pressurize a mixture heated on the sorting member to allow a melted resin mixed in the mixture to adhere to the sorting member to sort the resin from an unmelted resin. Thus, resin materials are sorted and recovered from unwanted home electric appliances and the like at a high purity.

11 Claims, 4 Drawing Sheets

METHOD OF SORTING RESIN

The present application is based on International Application PCT/JP2008/000375 filed Feb. 28, 2008, which claims priority to Japanese Patent Application No. 2007-120431, filed May 1, 2007, the entire contents of which are hereby incorporated by reference.

TECHNICAL FIELD

The present invention relates to a technique of sorting resin from a mixture with resin pieces mixed therein in order to allow used home electric appliances to be reused as resources.

BACKGROUND ART

Recent economic activities involving mass production, consumption, and disposal have posed global environmental problems such as global warming and resource depletion. In this situation, in order to construct a recycling society, the Home Appliance Recycling Law went into effect in April 2001 that used air conditioners, televisions, refrigerator-freezers, and washing machines must be recycled.

Unneeded home electric appliances have been conventionally crushed at home electric appliance recycling factories and sorted and recovered by material utilizing magnetic force, wind power, vibration, or the like so as to be used as resources. Particularly metal materials are very efficiently recovered as resources using a gravity separator or a magnetic separator; each material such as iron, copper, or aluminum is recovered at a high purity.

On the other hand, for resin materials, polypropylene (PP), which has a low specific gravity, is sorted from materials with high specific gravities by means of gravity separation utilizing water and recovered at a relatively high purity. However, the gravity separation utilizing water very disadvantageously produces a large amount of effluent and fails to sort PS (polystyrene) and ABS (acrylonitrile styrene butadiene), which have similar specific gravities, from each other.

(Patent Document 1) and (Patent Document 2) propose sorting methods taking into account the problems associated with the reuse of resin materials as resources.

The sorting method in (Patent Document 1) utilizes the difference in melting point between two types of resins to be sorted. The sorting method sorts the two types of resins from each other by heating a pair of peripheral moving surfaces made of heat resistant steel so as to have a temperature between the melting temperatures of the two types of resin to be sorted, passing the two types of resins to be sorted from each other through the gap between the heated peripheral moving surfaces to allow only one of the resins having the lower melting temperature to adhere to the heated peripheral surfaces.

Furthermore, the sorting method in (Patent Document 2) utilizes the difference in dielectric loss between resin materials. The sorting method sorts the resin materials from each other by applying an electromagnetic wave or the like to a mixture with at least two types of resins mixed therein to cause dielectric heating and utilizing the difference in melting characteristics between the resin materials based on the difference in heating nature between the resin materials. The above-described sorting methods do not produce effluent or are not affected by the specific gravities of the resin materials.
[Patent Document 1] Japanese Utility Model Laid-Open No. 4-126822
[Patent Document 2] Japanese Patent Laid-Open No. 2002-234031

However, according to (Patent Document 1), in low-polarity molecule substances with low adhesion to other substances such as PP and PS, the melted resin exhibits an unstable adherence strength. This prevents sorting at a high purity. Furthermore, when a resin with a low melting point and a resin with a high melting point pass simultaneously through the gap between the heated peripheral moving surfaces, the unmelted resin with a high melting point adheres to the melted resin with a low melting point, hindering sorting disadvantageously.

Furthermore, (Patent Document 2) fails to sort resin materials exhibiting similar dielectric loss characteristics. This makes recovery at a high purity difficult.

The present invention solves the above-described conventional problems. An object of the present invention is to provide a method of sorting resin materials at a high purity which method prevents the generation of effluent and is not affected by the specific gravity or dielectric loss characteristics of the resin materials.

DISCLOSURE OF THE INVENTION

To accomplish the above-described object, a method of sorting resin according to a first invention is characterized by comprising making a particle size of a mixture with at least two types of resins with different melting temperatures mixed therein, uniform within a predetermined range, placing the mixture with the particle size made uniform, on a sorting member having at least one of a recess portion and a protruding portion on a surface of the sorting member on which the mixture is placed, a distance between the adjacent recess portions or protruding portions being less than a minimum particle size of the mixture, a depth of the recess portion or a height of the protruding portion being less than the minimum particle size of the mixture, a diameter of the recess portion or the protruding portion being less than the minimum particle size of the mixture, then heating the mixture placed on the sorting member to a temperature between the melting temperatures of two types of resins included in the at least two types of resins with the different melting temperatures, and pressurizing the heated mixture to allow the melted resin mixed in the pressurized mixture to adhere to the sorting member for resin sorting.

A method of sorting resin according to a second invention is characterized by comprising making a particle size of a mixture with at least three types of resins with different melting temperatures mixed therein, uniform within a preset range, then as a first sorting procedure, placing the mixture with the particle size made uniform, on a sorting member having at least one of a recess portion and a protruding portion on a surface of the sorting member on which the mixture is placed, a distance between the adjacent recess portions or protruding portions being less than a minimum particle size of the mixture, a height of the recess portion or the protruding portion being less than the minimum particle size of the mixture, a diameter of the recess portion or the protruding portion being less than the minimum particle size of the mixture, subsequently primarily heating the mixture placed on the sorting member to a temperature lower than the melting temperatures of at least any two types of resins included in the at least three types of resins with the different melting temperatures, and primarily pressurizing the primarily heated mixture to allow the melted resin mixed in the primarily pressurized mixture to adhere to the first sorting member to sort the melted resin from the unmelted mixture mixed in the primarily pressurized mixture, then as a second sorting procedure, placing the mixture unmelted during the first sorting procedure, on a sorting member having at least one of a recess portion and a protruding portion on a surface of the sorting member on which the mixture is placed, a distance between the adjacent recess portions or protruding portions being less than a minimum particle size of the mixture, a height of the recess portion or the protruding portion being less than the minimum particle size of the mixture, a diameter of the recess portion or the protruding portion being less than the minimum particle size of the mixture, and secondarily heating the mixture undeposited during the first sorting procedure and placed on the second sorting member to a temperature between the melting temperatures of at least any two types of resins included in the mixture undeposited during the first sorting procedure, and secondarily pressurizing the secondarily heated mixture to allow the melted resin mixed in the secondarily pressurized mixture to adhere to the second sorting member to sort the resin from the mixture unmelted during the first sorting procedure.

A method of sorting resin according to a third invention is characterized by comprising making a particle size of a mixture with at least three types of resins with different melting temperatures mixed therein, uniform within a preset range, then as a first sorting procedure, placing the mixture with the particle size made uniform, on a sorting member having at least one of a recess portion and a protruding portion on a surface of the sorting member on which the mixture is placed, a distance between the adjacent recess portions or protruding portions being less than a minimum particle size of the mixture, a height of the recess portion or the protruding portion being less than the minimum particle size of the mixture, a diameter of the recess portion or the protruding portion being less than the minimum particle size of the mixture, subsequently primarily heating the mixture placed on the first sorting member to a temperature higher than the melting temperatures of at least any two types of resins included in the at least three types of resins with the different melting temperatures, and primarily pressurizing the primarily heated mixture to allow the melted resin group mixed in the primarily pressurized mixture to adhere to the first sorting member to sort the melted resin group from the unmelted mixture mixed in the primarily pressurized mixture, then as a second sorting procedure, peeling the resin group adhering to the first sorting member off the first sorting member, placing the peeled resin group on a second sorting member having at least one of a recess portion and a protruding portion on a surface of the sorting member on which the mixture is placed, a distance between the adjacent recess portions or protruding portions being less than a minimum particle size of the mixture, a height of the recess portion or the protruding portion being less than the minimum particle size of the mixture, a diameter of the recess portion or the protruding portion being less than the minimum particle size of the mixture, and secondarily heating the resin group placed on the second sorting member to a temperature between the melting temperatures of at least any two types of resins included in the resin group placed on the second sorting member, and secondarily pressurizing the secondarily heated resin group to allow the melted resin mixed in the secondarily pressurized resin group to adhere to the second sorting member to sort the resin from the resin group adhering to the first sorting member.

The first to third inventions are, in one aspect, characterized in that the surface of the sorting member on which the mixture is placed has recess portions, the distance between the adjacent recess portions of the sorting member is less than the minimum particle size of the mixture, a depth of the recess portion is at least 40 μm and less than the minimum particle size of the mixture, and the diameter of the recess portion is at least 50 and less than the minimum particle size of the mixture.

The first to third inventions are, in one aspect, characterized in that the surface of the sorting member on which the mixture is placed has cylindrical protruding portions, the distance between the adjacent cylindrical protruding portions of the sorting member is less than the minimum particle size of the mixture, the height of the cylindrical protruding portion is at least 50 μm and less than the minimum particle size of the mixture, and a diameter of a bottom surface of the cylindrical protruding portion is at least 100 μm and less than the minimum particle size of the mixture.

The first to third inventions are, in one aspect, characterized in that the surface of the sorting member on which the mixture is placed has recesses and protrusions with a surface roughness Ra of at least 0.6 μm and less than 55 μm.

The first invention may be characterized in that the mixture comprises PS and ABS and is heated to a temperature of at least 110° C. and at most 125° C.

The first invention may be characterized in that the mixture comprises ABS and PP and is heated to a temperature of at least 130° C. and at most 145° C.

The first invention may be characterized in that the mixture comprises PS and PP and is heated to a temperature of at least 110° C. and at most 145° C.

The second invention may be characterized in that the mixture comprises PS, ABS, and PP and is primarily heated to a temperature of at least 110° C. and at most 125° C. and secondarily heated to a temperature of at least 130° C. and at most 145° C.

The third invention may be characterized in that the mixture comprises PS, ABS, and PP and is primarily heated to a temperature of at least 130° C. and at most 145° C. and secondarily heated to a temperature of at least 110° C. and at most 125° C.

According to the present invention, when the mixture heated on the sorting member is pressurized to allow the melted resin mixed in the mixture to adhere to the sorting member to sort the resin from the unmelted resin, the particle size of the mixture with the resins with the different melting temperatures mixed therein is made uniform within the preset range, and the sorting member with the pre-optimized surface shape is used. Thus, the adhesive strength of the melted resin can be stabilized. This makes it possible to prevent the melted resin from failing to adhere to the sorting member and mixing with the unmelted resin. Therefore, very pure resin materials can be obtained.

BEST MODE FOR CARRYING OUT THE INVENTION

Figure 1:
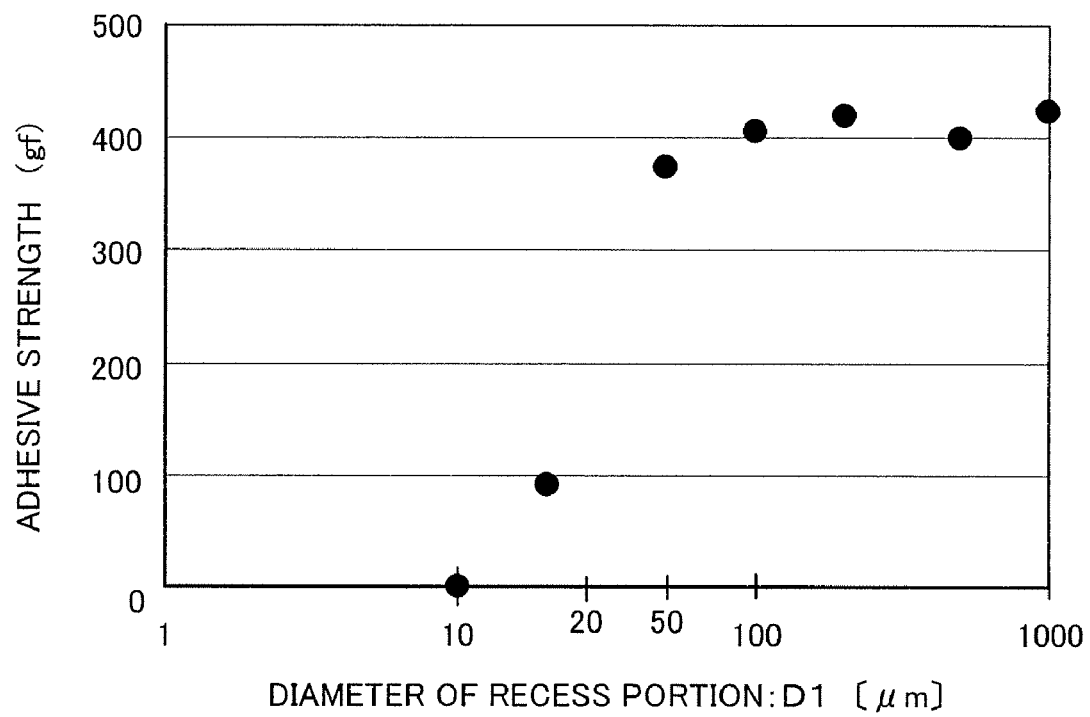
FIG. 1 is a diagram of the relationship between the adhesive strength of a resin and the surface shape of a sorting member, showing an embodiment of the present invention.

A method of sorting resin according to the present invention will be described on the basis of specific embodiments thereof.

Table 1 shown below shows the results of measurements of the melting temperatures of a PS resin, an ABS resin, and a PP resin, which are general-purpose resin types used in home electric appliances. For each of the resin types, measurements were performed on a representative resin with the corresponding product number. Product number G100C manufactured by TOYO STYRENE Co., Ltd. was used as PS. Product number VW20 manufactured by UMG ABS, Ltd. was used as ABS. Product number J6083HP manufactured by Idemitsu Kosan Co., Ltd. was used as PP.

TABLE 1

| | RESIN TYPE | | |
|---|---|---|---|
| | PS | ABS | PP |
| PRODUCT NUMBER | G100C | VW20 | J6083HP |
| MAKER | TOYO STYRENE | UMG | IDEMITSU KOSAN |
| MELTING TEMPERATURE | 97° C. | 128° C. | 153° C. |

The melting temperature was defined as a temperature at which the thickness of a resin pellet softened by increasing the temperature of the resin pellet while imposing a load of 300 gf thereon decreased by 1%.

As seen in Table 1, the melting temperatures of the PS, ABS, and PP resins were clearly different from those of the other types.

To allow a heated and melted resin to adhere to a sorting member to sort the resin from an unmelted resin, it is necessary to allow the melted resin to adhere to the sorting member and then to remove only the unmelted and unattached resin from the sorting member. In removing the unattached resin from the sorting member using vibration, wind power, shear force, or the like, it is necessary to ensure an adhesive strength of at least 100 gf in order to prevent the melted resin adhering to the sorting member from being removed together with the unattached resin.

Table 2 shown below shows the results of measurements of the adhesive strengths of the resin pellets with the respective resin product numbers measured when each of the resin pellets was deposited on a sorting member made of heat resistant steel, at the melting temperature shown in Table 1. For any of the resin product numbers, adhesive force is less than 100 gf. The force with which the melted resin adhered to the sorting member needs to be increased in order to pressurize a mixture heated on the sorting member via the sorting member and allow the melted resin mixed in the mixture to adhere to the sorting member to sort the resin from the unmelted resin.

TABLE 2

| | RESIN TYPE | | |
|---|---|---|---|
| | PS | ABS | PP |
| PRODUCT NUMBER | G100C | VW20 | J6083HP |
| MAKER | TOYO STYRENE | UMG | IDEMITSU KOSAN |
| ADHESIVE STRENGTH | 8 gf | 15 gf | 0 gf |

A low intermolecular force is exhibited between a low-polarity molecule substance such as PS or PP and another substance. Thus, to ensure the force required to adhere to the sorting member, a mechanical fitting structure based on an anchor effect or the like is expected to be effectively used. Thus, optimization of the surface structure of the sorting member was examined.

Figure 2:
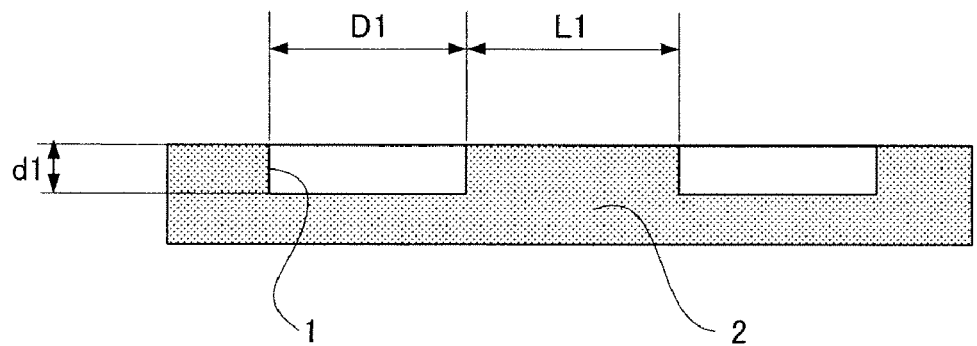
FIG. 2 is a diagram of the structure of a sorting member having recess portions formed on a surface thereof, showing the embodiment of the present invention.

FIG. 1 shows the results of examination of the effect of the surface shape of the sorting member on the adhesive strength of the resin. The effect of the diameter D1 of the recess portion 1 on the adhesive strength of the resin was measured using a heat resistant steel plate 2 with recess portions 1 formed on a surface thereof as shown in FIG. 2, as a sorting member. A PS resin pellet of φ2 mm (TOYO STYRENE Co., Ltd.; G100C) was allowed to adhere to the sorting member under the following conditions: the depth of the recess portion 1: d1=60 μm, the distance between the adjacent recess portions 1: L1=300 μm, a heating temperature of 100° C., an applied pressure of 300 gf, and a pressing time of 60 seconds.

When the diameter D1 of the recess portion 1 is at least 50 μm, the adhesive strength of the PS resin exhibited a constant value of about 400 gf. However, when the diameter D1 of the recess portion 1 is at most 20 μm, the adhesive strength was at most 100 gf, and when the diameter D1 of the recess portion 1 is 10 μm, the resin failed to adhere to the sorting member. Furthermore, when the diameter D1 of the recess portion 1 is equal to or more than the size of the resin, the resin infiltrates into a hole when allowed to adhere to the sorting member and cannot be removed. Therefore, the diameter D1 of the recess portion 1 of the sorting member is preferably at least 50 μm and less than the minimum particle size of the resin.

Figure 3:
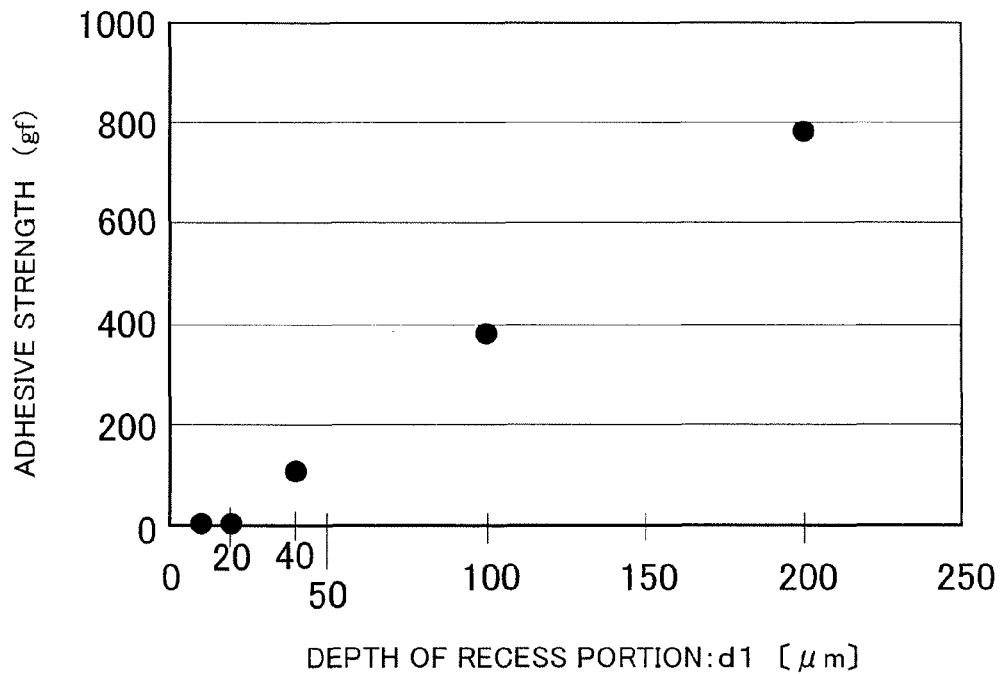
FIG. 3 is a diagram of the relationship between the adhesive strength of the resin and the surface shape of a sorting member, showing the embodiment of the present invention.

FIG. 3 shows the results of examination of the effect of the depth of the recess portions on the surface of the sorting member on the adhesive strength of the resin. The PS resin pellet of φ2 mm (TOYO STYRENE Co., Ltd.; G100C) was allowed to adhere to the sorting member under the following conditions: the diameter of the recess portion 1: D1=200 μm, the distance between the adjacent recess portions 1: L1=300 μm, the temperature of heating via the sorting member: 100° C., an applied pressure of 300 gf, and a pressing time of 60 seconds. The PS resin failed to adhere to the sorting member when the depth d1 of the recess portion 1 of the sorting member was 20 μm or less. However, when the depth d1 was 40 μm, the adhesive strength was 100 gf. At a greater depth, the adhesive strength increased in proportion to the depth of the recess portion 1.

Moreover, when the depth d1 of the recess portion 1 was at least 2 mm, the attached resin failed to be removed. Therefore, the depth d1 of the recess portion 1 of the sorting member is preferably at least 40 μm and less than the minimum particle size of the resin.

Furthermore, when the distance L1 between the adjacent recess portions 1 is equal to or greater than the diameter of the resin pellet, the resin pellet may fail to contact the recess portion 1. Thus, the distance L1 between the adjacent recess portions 1 is preferably less than the minimum particle size of the resin.

Figure 4:
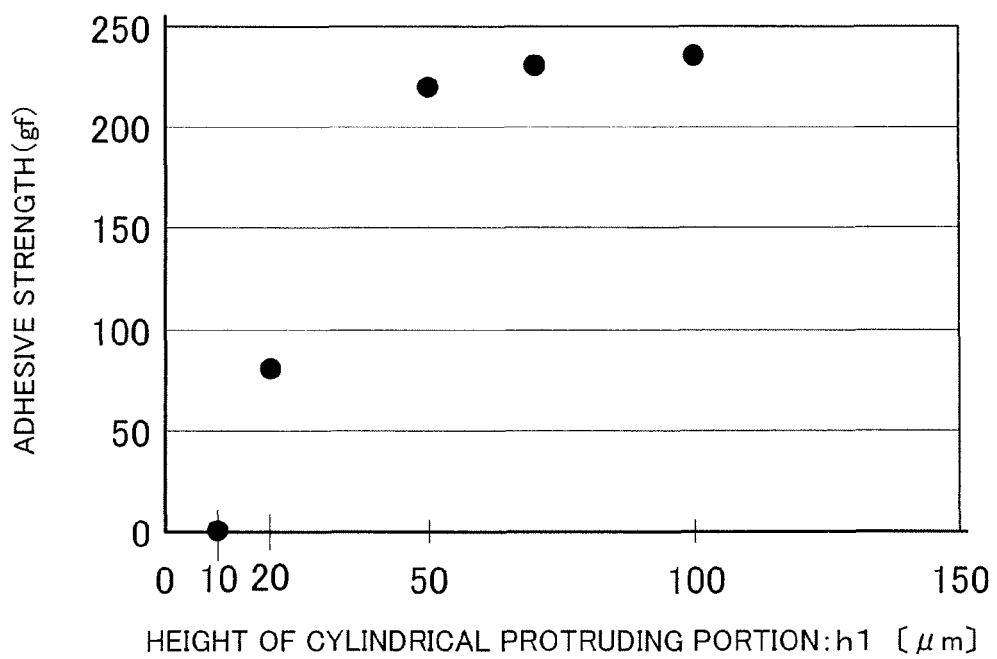
FIG. 4 is a diagram of the relationship between the adhesive strength of the resin and the surface shape of a sorting member, showing the embodiment of the present invention.
Figure 5:
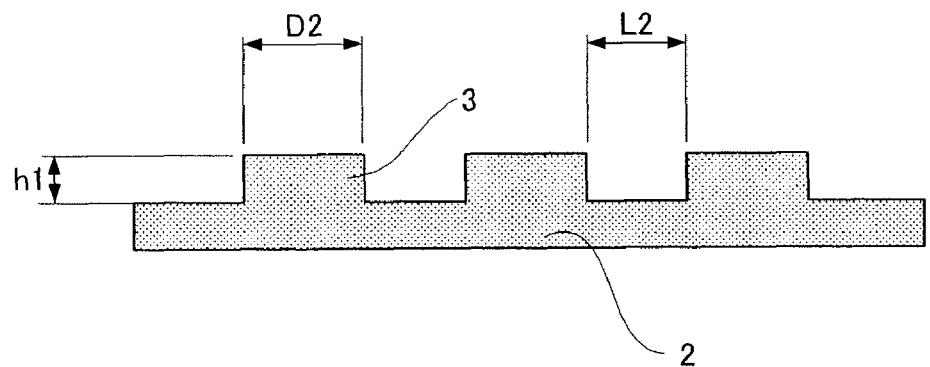
FIG. 5 is a diagram of the structure of a sorting member having cylindrical protruding portions formed on a surface thereof, showing the embodiment of the present invention.

FIG. 4 shows the results of measurements using, as a sorting member, a heat resistant steel plate with cylindrical protruding portions 3 formed on a surface thereof as shown in FIG. 5; the measurements were made of the effect of the height h1 of the cylindrical protruding portion 3 on the adhesive strength of the resin. The PS resin pellet of φ2 mm (TOYO STYRENE Co., Ltd.; G100C) was allowed to adhere to the sorting member under the following conditions: the diameter of a bottom surface of the cylindrical protruding portion 3: D2=200 μm, the distance between the adjacent cylindrical protruding portions: L2=300 μm, the temperature of heating via the sorting member: 100° C., an applied pressure of 300 gf, and a pressing time of 60 seconds. When the height h1 of the cylindrical protruding portion 3 was at least 50 μm, the adhesive strength of the PS resin exhibited a constant value of about 250 gf. However, when the diameter D2 of the bottom surface of the cylindrical protruding portion 3 was at most 20 μm, the adhesive strength was less than 100 gf. At D2=10 μm, the PS resin failed to adhere to the sorting member. Furthermore, when the height of the cylindrical protruding portion is equal to or more than the size of the resin, the resin is too adhesive to remove. Therefore, the height h1 of the cylindrical protruding portion 3 of the sorting member is preferably at least 50 μm and less than the minimum particle size of the resin.

When the diameter of the bottom surface of the cylindrical protruding portion 3 is less than 100 μm, the strength of the structure of the cylindrical protruding portion decreases. Furthermore, when the diameter D2 of the bottom surface of the cylindrical protruding portion 3 is equal to or greater than the diameter of the resin pellet, a mechanical fitting effect may fail to be exerted. Thus, the diameter D2 of the bottom surface of the cylindrical protruding portion 3 is preferably at least 100 μm and less than the minimum particle size of the resin. Additionally, when the distance L2 between the adjacent cylindrical protruding portions 3 is equal to or greater than the diameter of the resin pellet, the mechanical fitting effect may fail to be exerted. Thus, the distance between the adjacent cylindrical protruding portions 3 is preferably less than the minimum particle size of the resin. The present embodiment allows the resin to exhibit the appropriate adhesive strength by forming one of the recess portion and the protruding portion on the surface of the sorting member. However, the resin similarly exhibits the appropriate adhesive strength even when both the recess portion and the protruding portion are formed on the surface of the sorting member.

Figure 6:
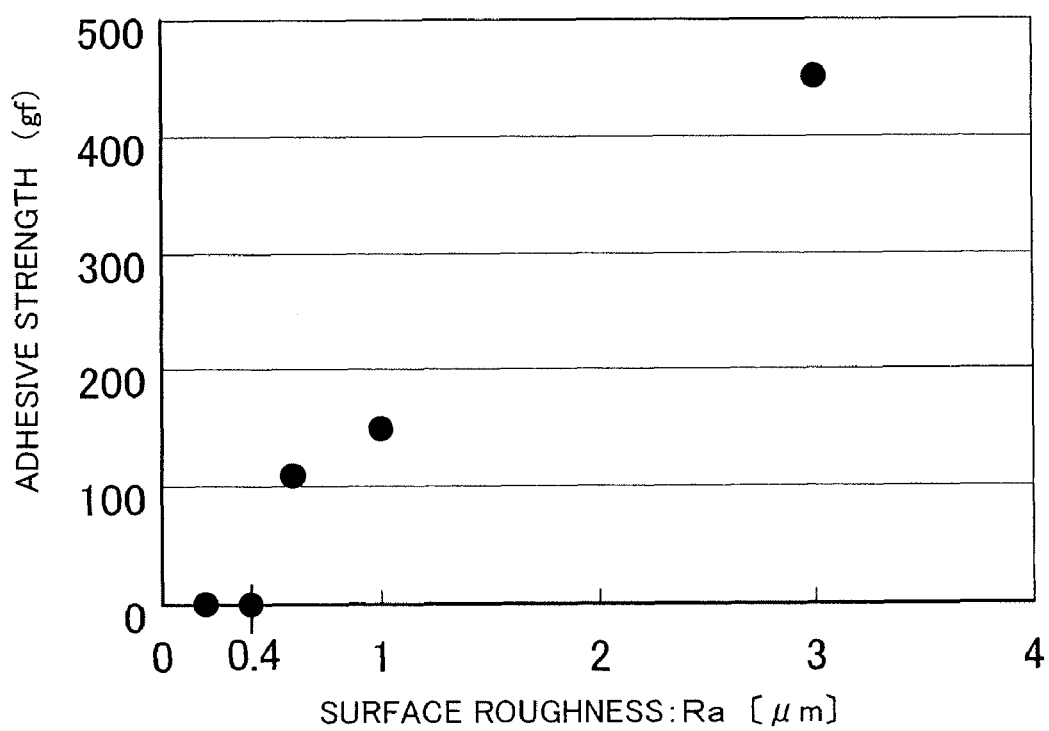
FIG. 6 is a diagram of the relationship between the adhesive strength of the resin and the surface shape of a sorting member, showing the embodiment of the present invention.

FIG. 6 shows the results of examination of the relationship between the surface roughness of a sorting member and the adhesive strength of the resin; the sorting member was a heat resistant steel plate subjected to a sandblast process using an alumina-based polishing material of an average particle size of 24 to 550 μm. The PS resin pellet of 42 mm (TOYO STYRENE Co., Ltd.; G100C) was allowed to adhere to the sorting member under the following conditions: a heating temperature of 110° C., an applied pressure of 300 gf, and a pressing time of 60 seconds. The sandblast process was found to improve the adhesive strength. Furthermore, no adhesive strength was exhibited when Ra was less than 0.4 μm. When Ra exceeded 55 μm, the resin remained in the roughened surface, requiring maintenance of the sorting member. Therefore, the surface roughness Ra is preferably at least 0.6 μm and less than 55 μm. In general, the arithmetic average roughness Ra exhibits values from one-tenth to one-third of the maximum height Ry. The results of measurements of samples in the present embodiment exhibited a similar tendency, indicating that the size of the recesses and protrusions on the surface of the sorting member which has a surface roughness Ra of 55 μm is much smaller than the diameter of the PS resin pellet of φ2 mm. Furthermore, since the polishing material used for the sandblast process has a particle size of 550 μm or less, the distance between adjacent vertexes is theoretically equal to or less than 550 μm and is thus much shorter than the diameter of the PS resin pellet of φ2 mm.

Figure 7:
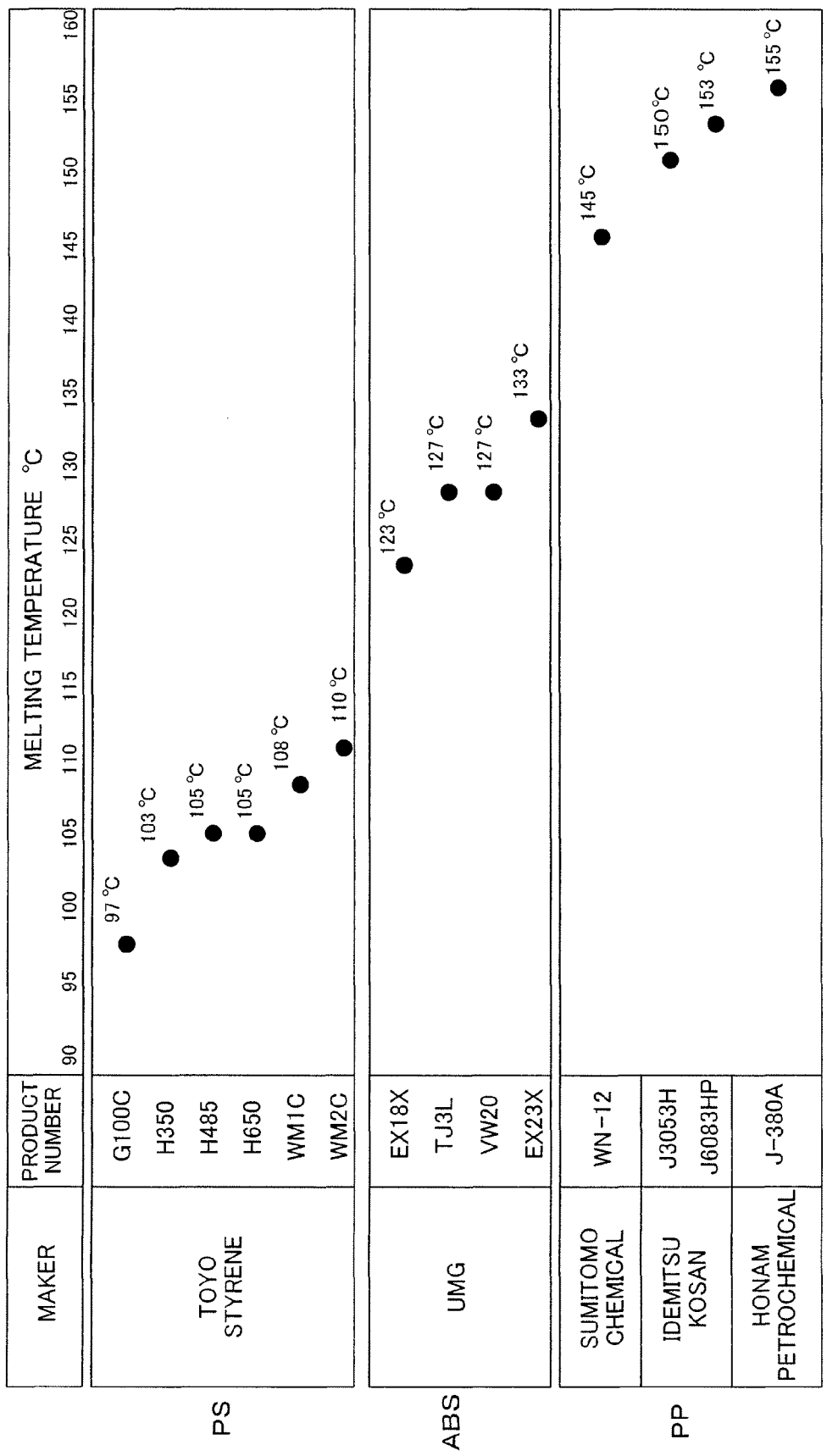
FIG. 7 is a diagram of the results of measurements of the adhesion temperature of the resin, showing the embodiment of the present invention.

FIG. 7 shows the results of measurements of the deposition temperatures of a PS resin, an ABS resin, and a PP resin using, as a sorting member, a heat resistant steel plate subjected to the sandblast process so as to exhibit a surface roughness Ra of 30 μm. For each of the resin types, a plurality of representative resins with different product numbers were measured. Resins with product numbers G100C, H350, H485, H650, WM1C, and WM2C manufactured by TOYO STYRENE Co., Ltd. were used as PS. Resins with product numbers EX18X, TJ3L, VW20, and EX23X manufactured by UMG ABS, Ltd. were used as ABS. The following were used as PP: a resin with product number WN-12 manufactured by Sumitomo Chemical Co., Ltd., resins with product numbers J3053H and J6083HP manufactured by Idemitsu Kosan Co., Ltd., and a resin with product number J-380A manufactured by HONAM PETROCHEMICAL CORP.

The adhesion conditions other than the temperature of heating via the sorting member were an applied pressure of 300 gf, a pressing time of 60 seconds, and a resin size of φ2 mm. The deposition temperature was set equal to the heating temperature at which an adhesive strength of at least 100 gf was exhibited.

FIG. 7 shows that there is a significant difference in deposition temperature from the other product types between the PS resin and the ABS resin and the PP resin in spite of a slight difference in deposition temperature within the same product type.

FIG. 7 indicates that PS and ABS can be roughly sorted from each other by heating the resins between 110° C. and 115° C. via the sorting member. For sorting at a higher purity, the heating temperature is preferably between 114° C. and 120° C.

ABS and PP can be roughly sorted from each other by heating the resins between 130° C. and 145° C. via the sorting member. For sorting at a higher purity, the heating temperature is preferably between 135° C. and 142° C.

PS and PP can be roughly sorted from each other by heating the resins between 110° C. and 145° C. via the sorting member. For sorting at a higher purity, the heating temperature is preferably between 114° C. and 142° C.

According to a first method of sorting PS, ABS, and PP from one another, the resins are first heated between 110° C. and 125° C. via the sorting member to sort PS from the other resins. The remaining resins are then heated between 130° C. and 145° C. via the sorting member. ABS and PP can then be sorted from each other. For sorting at a higher purity, the resins are first heated between 114° C. and 120° C. to sort PS from the other resins. The remaining resins are then heated between 135° C. and 142° C. via the sorting member. ABS and PP can then be sorted from each other.

According to a second method of sorting PS, ABS, and PP from one another, the resins are first heated between 130° C. and 145° C. via the sorting member to sort PP from the other resins. The remaining resins are then heated between 110° C. and 125° C. via the sorting member. PS and ABS can then be sorted from each other. For sorting at a higher purity, the resins are first heated between 135° C. and 142° C. to sort PP from the other resins. The remaining resins are then heated between 114° C. and 120° C. via the sorting member. PS and ABS can then be sorted from each other.

Embodiment

Description will be given of an embodiment of sorting of resin from a used home electric appliance according to the present invention.

The present embodiment is intended for a mixture obtained by crushing the used home electric appliance using a well-known method and roughly sorting and removing metal materials and the like using magnetic force, wind power, vibration, or the like.

The method of sorting resin according to the present invention includes pressurizing the mixture heated on a sorting member, via the sorting member and allowing a melted resin mixed in the mixture to adhere to the sorting member to sort the resin from an unmelted resin. During the pressurizing step, a plurality of resin pieces and the like are pressurized at a time. Thus, sorting accuracy can be improved by pre-making the particle size of the mixture uniform within a set range.

Thus, the particle size of the mixture from which the metal materials and the like have been roughly sorted and removed was made uniform using sieves. A sieve with an aperture of 4.75 mm was used to remove bulky substances from the mixture. A sieve with an aperture of 1.0 mm was used to remove small mixed pieces and powder from the mixture. Thus, the mixture with the uniform particle size was obtained.

Then, a heat resistance steel plate of 1 mm in thickness subjected to the sandblast process so as to exhibit a surface roughness Ra of 30 μm was placed on a lower hot plate in a hydraulic plate heat press machine. The mixture with the uniform particle size was homogeneously spread on the heat resistant steel plate so as to avoid overlapping. A cushion material was placed on the homogeneously spread mixture. The homogenously spread mixture was then primarily heated and pressurized via the heat resistant steel plate as a sorting member. As conditions for the primary heating and pressurization, the temperature of heating via the heat resistant steel plate was set to 117° C. The applied pressure was set to 100 gf per mixed piece in the mixture on an average, and the mixture was heated and pressurized for 60 seconds. After the primary heating and pressurization, the heat resistant steel plate and the homogeneously spread mixture were taken out at a time and then cooled in a cooling plate. When the surface temperature of the heat resistant steel plate and the homogeneously spread mixture became 30° C. or lower, the heat resistant steel plate was tilted to sort a mixed piece undeposited on the heat resistant steel plate from the mixed pieces contained in the homogeneously spread mixture. Then, the particle size of the mixture with at least two types of resins with different melting temperatures mixed therein was made uniform within the preset range, and the mixed piece deposited on the heat resistant steel plate was peeled off the heat resistant steel plate using a stainless (SUS) piece of 1 mm in thickness for sorting.

Then, the mixture was secondarily heated and pressurized via the heat resistant steel plate as a sorting member to sort the mixed piece undeposited in spite of the primary heating and pressurization, from the deposited mixed piece. The secondary heating and pressurization was performed under the same conditions as those for the primary heating and pressurization except the temperature condition; the temperature of heating via the heat resistant steel plate was 137° C. The sorting after the secondary heating and pressurization was performed under the same conditions as those for the sorting after the primary heating and pressurization.

Then, the mixture was tertiarily heated and pressurized to sort the mixed piece undeposited in spite of the secondary heating and pressurization, from the deposited mixed piece. The tertiary heating and pressurization was performed under the same conditions as those for the primary heating and pressurization except the temperature condition; the temperature of heating via the heat resistant steel plate was 165° C. The sorting after the tertiary heating and pressurization was performed under the same conditions as those for the sorting after the primary heating and pressurization.

Qualitative analysis was made of the deposited mixed pieces sorted by the primary to tertiary heating and pressurizing processes and the mixed piece undeposited in spite of the tertiary heating and pressurization.

When visually and palpatorily checked, the deposited mixed pieces sorted by the primary to tertiary heating and pressurizing processes were found to contain only the resin materials and no metal, woods, paper, film, or the like mixed therein. Furthermore, as a result of composition analysis using an infrared spectrophotometer, the PS resin was detected in the deposited mixed piece sorted by the primary heating and pressurization. The ABS resin was detected in the deposited mixed piece sorted by the secondary heating and pressurization. The PP resin was detected in the deposited mixed piece sorted by the tertiary heating and pressurization.

Furthermore, when visually and palpatorily checked, the mixed piece undeposited in spite of the tertiary heating and pressurization was found to contain metal, woods, paper, and film.

In the above description, the mixture of the resins to be sorted from one another is heated to the set temperature via the sorting member. However, the mixture of the resins to be sorted from one another can be sorted by heating the mixture directly from above the sorting member to the set temperature without using the sorting member.

INDUSTRIAL APPLICABILITY

According to the present invention, the sorting member with the pre-optimized surface shape was adopted to sort the unmelted resin. Resin sorting can thus be achieved such that the adhesive strength of the melted resins is stabilized to obtain a very pure resin material. This in turn makes it possible to contribute to reusing the resin materials as resources.

The invention claimed is:

1. A method of sorting resin, comprising:
making a particle size of a mixture with at least two types of resins with different melting temperatures mixed therein, uniform within a predetermined range;
placing the mixture with the particle size made uniform, on a sorting member having at least one of a recess portion and a protruding portion on a surface of the sorting member on which the mixture is placed, a distance between the adjacent recess portions or protruding portions being less than a minimum particle size of the mixture, a depth of the recess portion or a height of the protruding portion being less than the minimum particle size of the mixture, a diameter of the recess portion or the protruding portion being less than the minimum particle size of the mixture;
then heating the mixture placed on the sorting member to a temperature between the melting temperatures of two types of resins included in the at least two types of resins with the different melting temperatures; and
pressurizing the heated mixture to allow the melted resin mixed in the pressurized mixture to adhere to the sorting member for resin sorting.

2. A method of sorting resin, comprising:
making a particle size of a mixture with at least three types of resins with different melting temperatures mixed therein, uniform within a preset range;
then as a first sorting procedure, placing the mixture with the particle size made uniform, on a sorting member having at least one of a recess portion and a protruding portion on a surface of the sorting member on which the mixture is placed, a distance between the adjacent recess portions or protruding portions being less than a minimum particle size of the mixture, a height of the recess portion or the protruding portion being less than the minimum particle size of the mixture, a diameter of the recess portion or the protruding portion being less than the minimum particle size of the mixture;
subsequently primarily heating the mixture placed on the sorting member to a temperature lower than the melting temperatures of at least any two types of resins included in the at least three types of resins with the different melting temperatures, and primarily pressurizing the primarily heated mixture to allow the melted resin mixed in the primarily pressurized mixture to adhere to the first sorting member to sort the melted resin from the unmelted mixture mixed in the primarily pressurized mixture;
then as a second sorting procedure, placing the mixture unmelted during the first sorting procedure, on a sorting member having at least one of a recess portion and a protruding portion on a surface of the sorting member on which the mixture is placed, a distance between the adjacent recess portions or protruding portions being less than a minimum particle size of the mixture, a height of the recess portion or the protruding portion being less than the minimum particle size of the mixture, a diameter of the recess portion or the protruding portion being less than the minimum particle size of the mixture; and
secondarily heating the mixture undeposited during the first sorting procedure and placed on the second sorting member to a temperature between the melting temperatures of at least any two types of resins included in the mixture undeposited during the first sorting procedure, and secondarily pressurizing the secondarily heated mixture to allow the melted resin mixed in the secondarily pressurized mixture to adhere to the second sorting member to sort the resin from the mixture unmelted during the first sorting procedure.

3. A method of sorting resin, comprising:
making a particle size of a mixture with at least three types of resins with different melting temperatures mixed therein, uniform within a preset range;
then as a first sorting procedure, placing the mixture with the particle size made uniform, on a sorting member having at least one of a recess portion and a protruding portion on a surface of the sorting member on which the mixture is placed, a distance between the adjacent recess portions or protruding portions being less than a minimum particle size of the mixture, a height of the recess portion or the protruding portion being less than the minimum particle size of the mixture, a diameter of the recess portion or the protruding portion being less than the minimum particle size of the mixture;
subsequently primarily heating the mixture placed on the first sorting member to a temperature higher than the melting temperatures of at least any two types of resins included in the at least three types of resins with the different melting temperatures, and primarily pressurizing the primarily heated mixture to allow the melted resin group mixed in the primarily pressurized mixture to adhere to the first sorting member to sort the melted resin group from the unmelted mixture mixed in the primarily pressurized mixture;
then as a second sorting procedure, peeling the resin group adhering to the first sorting member off the first sorting member;
placing the peeled resin group on a second sorting member having at least one of a recess portion and a protruding portion on a surface of the sorting member on which the mixture is placed, a distance between the adjacent recess portions or protruding portions being less than a minimum particle size of the mixture, a height of the recess portion or the protruding portion being less than the minimum particle size of the mixture, a diameter of the recess portion or the protruding portion being less than the minimum particle size of the mixture; and
secondarily heating the resin group placed on the second sorting member to a temperature between the melting temperatures of at least any two types of resins included in the resin group placed on the second sorting member, and secondarily pressurizing the secondarily heated resin group to allow the melted resin mixed in the secondarily pressurized resin group to adhere to the second sorting member to sort the resin from the resin group adhering to the first sorting member.

4. The method of sorting resin according to claim 1, wherein the surface of the sorting member on which the mixture is placed has recess portions, the distance between the adjacent recess portions of the sorting member is less than the minimum particle size of the mixture, a depth of the recess portion is at least 40 μm and less than the minimum particle size of the mixture, and the diameter of the recess portion is at least 50 μm and less than the minimum particle size of the mixture.

5. The method of sorting resin according to claim 1, wherein the surface of the sorting member on which the mixture is placed has cylindrical protruding portions, the distance between the adjacent cylindrical protruding portions of the sorting member is less than the minimum particle size of the mixture, the height of the cylindrical protruding portion is at least 50 μm and less than the minimum particle size of the mixture, and a diameter of a bottom surface of the cylindrical protruding portion is at least 100 μm and less than the minimum particle size of the mixture.

6. The method of sorting resin according to claim 1, wherein the surface of the sorting member on which the mixture is placed has recesses and protrusions with a surface roughness Ra of at least 0.6 μm and less than 55 μm.

7. The method of sorting resin according to claim 1, wherein the mixture comprises PS and ABS and is heated to a temperature of at least 110° C. and at most 125° C.

8. The method of sorting resin according to claim 1, wherein the mixture comprises ABS and PP and is heated to a temperature of at least 130° C. and at most 145° C.

9. The method of sorting resin according to claim 1, wherein the mixture comprises PS and PP and is heated to a temperature of at least 110° C. and at most 145° C.

10. The method of sorting resin according to claim 2, wherein the mixture comprises PS, ABS, and PP and is primarily heated to a temperature of at least 110° C. and at most 125° C. and secondarily heated to a temperature of at least 130° C. and at most 145° C.

11. The method of sorting resin according to claim 3, wherein the mixture comprises PS, ABS, and PP and is primarily heated to a temperature of at least 130° C. and at most 145° C. and secondarily heated to a temperature of at least 110° C. and at most 125° C.

* * * * *